Patented Jan. 30, 1951

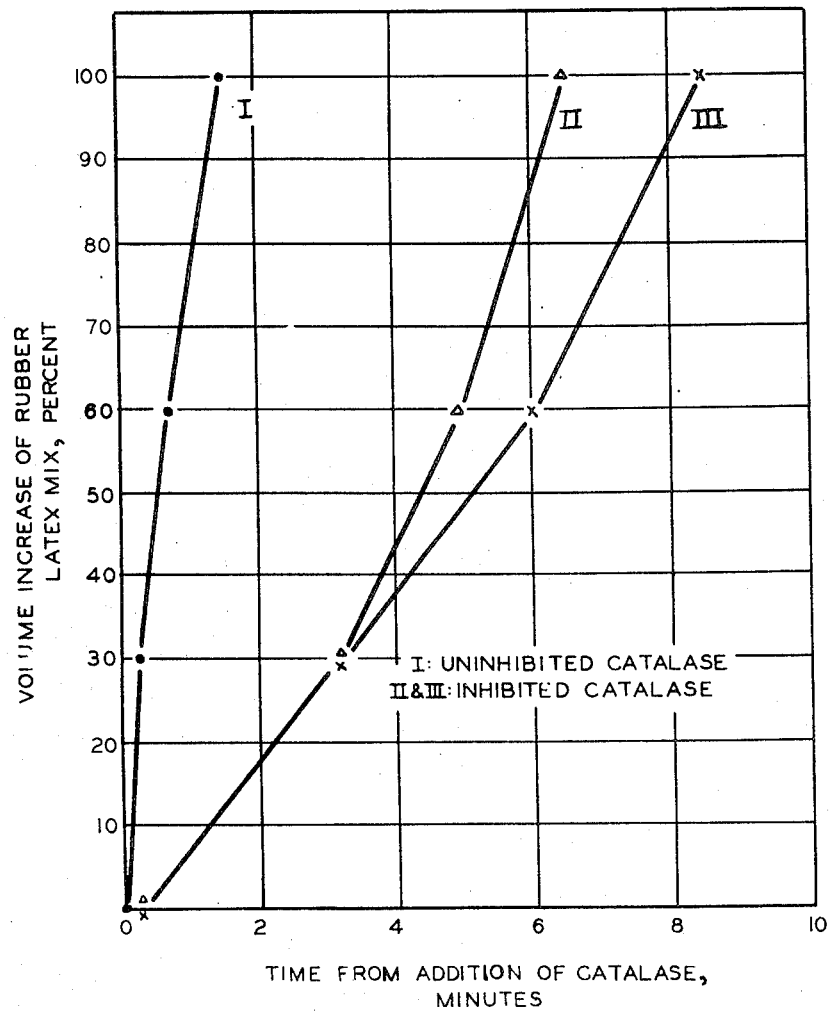
Fig. 1 — Effect of inhibited and uninhibited Penicillium catalase on hydrogen peroxide-containing rubber latex mix.

2,540,040

UNITED STATES PATENT OFFICE 2,540,040

METHOD OF MAKING FOAM RUBBER ARTICLES

Dwight L. Baker, Chicago, Ill., assignor to
Ben L. Sarett, Chicago, Ill.

Application August 13, 1948, Serial No. 44,138

3 Claims. (Cl. 260—723)

This invention relates to the production of porous or cellular masses and articles from substances possessing the essential characteristics of rubber. It is more particularly concerned with the production of cellular rubber from a mixture of hydrogen peroxide and a suitable rubber latex by a process which comprises adding to such a mixture an inhibited preparation of the enzyme catalase to decompose the hydrogen peroxide and to thereby convert the latex into foam, which is then solidified. The invention also is concerned with a particular type of inhibited catalase preparation that is especially suitable for use in the manufacture of spongy rubber.

The methods for producing porous masses from rubber latex and the like fall into two main categories, namely, those that depend on the addition of gas-forming agents for the development of the porosity and those in which the gas is introduced mechanically. The first-named method possesses several advantages over the second in that less equipment and apparatus is required as well as less handling and supervision. Furthermore, it would appear to be possible to obtain more uniform cell size and a better distribution of the cells by generating the gas in situ than by blowing or beating in the gas. Despite these advantages, the mechanical method of aeration has taken precedence. There are several reasons for this. For example, when inflating agents that require heat are used it is difficult to obtain proper heat transfer if the article being manufactured is comparatively large, such as a mattress or automobile cushion. The result is nonuniformity in the cell size and density of the article. On the other hand, if hydrogen peroxide and a material such as hemoglobin that contains the enzyme catalase is employed, heat is not required to generate the gas. Consequently, this method is more attractive industrially because it is simpler from the standpoint of processing and because the relatively costly heating equipment for this step is not required. However, the catalase preparations heretofore used act too quickly on the hydrogen peroxide and the resultant rapid generation of oxygen produces a viscous foam before the catalase can be uniformly dispersed throughout the latex mixture. In a typical case, for example, the volume expands to two or three times the original volume and the foam becomes viscous within about ten seconds after the addition of the catalase. This rapid liberation of oxygen inevitably leads to an irregular and nonuniform cell size and density in all but extremely small batches. In addition, the incomplete mixing leaves some of the hydrogen peroxide undecomposed. The presence of residual peroxide in the foam rubber frequently causes complications by its gradual decomposition during subsequent stages of manufacture and by its detrimental effect on the stability of the finished product. I have invented a method of overcoming these difficulties. Consequently, the use of my invention greatly increases the utility of the hydrogen peroxide method of producing cellular rubber and makes this method industrially attractive.

In one embodiment my invention relates to a method of forming cellular masses of rubber-like material which comprises subjecting an aqueous dispersion of a substance possessing the essential characteristics of rubber to the action of hydrogen peroxide and an inhibited catalase preparation comprising catalase and a water soluble compound capable of yielding a cyanide ion.

In a more specific embodiment my invention relates to a process for the production of cellular rubber articles which comprises commingling with an aqueous rubber dispersion a compound selected from the group consisting of hydrogen peroxide and peroxygen compounds capable of liberating hydrogen peroxide under the conditions of operation employed, commingling with the resultant mixture an aqueous solution containing catalase and a water soluble cyanide compound capable of yielding a cyanide ion, converting the dispersion into a foam through evolution of oxygen, and solidifying the foam.

In a still more specific embodiment my invention relates to a process for the production of cellular rubber articles which comprises commingling with an aqueous rubber dispersion a compound selected from the group consisting of hydrogen peroxide and peroxygen compounds capable of liberating hydrogen peroxide under the conditions of operation employed, commingling with the resultant mixture an aqueous solution containing catalase and sodium cyanide, converting the dispersion into a foam through evolution of oxygen, and solidifying the foam.

The starting material in my process for the production of cellular masses may be any substance possessing the essential characteristics of rubber, by which I mean substances that are capable of forming an aqueous dispersion; said dispersions possessing the ability to be transformed into a foam, the foam so produced having the capacity to be irreversibly set in its expanded form and, when set, having an elasticity and resilience similar to that of vulcanized rubber.

The preferred class of substances of this type of dispersions comprises natural, synthetic, and reclaimed rubber and materials such as gutta-percha and balata. The natural dispersions such as rubber latex may be employed in their natural concentrations or in the form of concentrates. The dispersions may be employed in a vulcanized condition, or may receive additions of vulcanizing agents if they are to be vulcanized later. All the dispersions may contain the usual additives, such as fillers, anti-oxidants, coloring matters, and accelerators of vulcanization.

Inflating agents that may be used in the process of this invention include hydrogen peroxide and peroxygen compounds that are soluble in the rubber latex and that are capable of liberating oxygen when contact with cyanide inhibited catalase in the presence of rubber latex. Suitable peroxygen compounds produce hydrogen peroxide in aqueous mediums either by hydrolysis or by dissociation. $Na_2O_2$, for example, produces hydrogen peroxide by hydrolysis, whereas

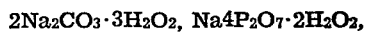

and $CO(NH_2)_2 \cdot H_2O_2$ liberate hydrogen peroxide by dissociation. Per-acids such as persulfuric acid, and their salts, which hydrolyze only slightly under the conditions prevailing, and compounds such as lead peroxide, which are not true peroxygen compounds related to hydrogen peroxide, are not suitable for use in my process because they are not decomposed by catalase. The alkali metal peroxides and the alkali metal and ammonium persulfates and perborates constitute a preferred class of peroxygen compounds. The hydrogen peroxide produced from the peroxygen compounds is acted upon and decomposed by the catalase, yielding oxygen.

The catalase used in my process may be obtained from any source such as the liver or erytherocytes of cattle and swine and from horse and lamb liver. However, the preferred class of catalase is that obtained from the molds employed in the commercial production of penicillin as disclosed in my copending application, Serial No. 783,036, filed November 25, 1947. This preferred catalase is obtained from the mold mycellia, preferably by autolysis; separating the solid cell residues from the catalase-bearing liquor thus obtained; and purifying said crude catalase. More particularly this new type of catalase is obtained by operating upon spent mold (*Penicillium chrysogenum,* or *Penicillium notatum*) obtained as refuse from the commercial production of penicillin. *Aspergillus niger* also may be used as a source material. According to a preferred mode of operation, the living mold is filtered, washed, and treated with a germicide, either organic, such as toluene, xylene, ethyl acetate, chloroform, etc., or inorganic, such as copper sulfate, to kill it, hasten autolysis, and prevent bacterial decomposition. The dead mold is allowed to autolyze, and the catalase is leached from the ruptured cells thereof. If the pH of the autolyzate falls below 6.0, it is made slightly alkaline to precipitate acid-soluble impurities. The autolyzate is then separated into a cell-free extract containing catalase, and an insoluble residue which is discarded. Thereafter, the extract preferably is made mildly acid to precipitate acid-insoluble impurities, which are removed. A protein-fractionating agent is then dissolved in the purified extract in such concentration and under such pH conditions that substantially all the catalase in the extract is precipitated without precipitating much inactive material. Acetone, ethanol, methanol, and ammonium sulfate are suitable fractionating agents. The crude catalase precipitate is collected, and the spent mixture of extract and fractionating agent is discarded. The crude catalase is then redissolved in a moderate quantity of aqueous solvent; the solution is made midly acid; and the catalase is reprecipitated. The catalase thus purified is collected, and is dissolved in a small volume of aqueous solvent, such as water or a mixture of water and glycerine. Any insoluble matter is removed, leaving a catalase solution of great potency and stability. When necessary, this solution may be preserved against bacterial decomposition by adding conventional germicides. If desired, the purified catalase may be obtained in stable solid form by drying the concentrated catalase solution in a vacuum, preferably while maintaining said solution in the frozen state.

Penicillium catalase is preferred for use in my process for several reasons. One is its increased tolerance to heat as compared to other types of catalase. Although in general the manufacture of foam rubber is carried out at room temperature or below, it occasionally is desirable to conduct the foaming operation at elevated temperatures. At such times, Penicillium catalase is superior to other catalases.

Another reason that I prefer to use Penicillium catalase in my process is because it, in general, not only possesses a somewhat greater activity than catalase obtained from other sources, but also because it is affected to a substantially smaller extent by changes in pH. For example, Penicillium catalase retains more than 70% of its maximum activity throughout the pH range of 3.0 to 10.0; whereas beef liver catalase maintains 70% of its maximum activity only over the comparatively narrow pH band of 5.7 to 8.1. Since the pH of many of the latex mixtures suitable for the production of foam rubber falls between 9 and 10, the advantages of Penicillium catalase over other catalase in this application is obvious. At a pH of 9.0, beef liver catalase exhibits less than 50% of its maximum activity, and at a pH of 10, its extra-polated activity is considerably less than 25% of its maximum. In contrast thereto, and as hereinbefore stated, Penicillium catalase has an activity at a pH of 10 that is at least 70% of its maximum.

One of the principal features of this invention relates to the formulation and to the use in the production of foam rubber and similar material of a special preparation of the enzyme catalase that I refer to as inhibited or inactivated catalase. I inhibit a catalase preparation by adding thereto an appropriate amount of a cyanide compound capable of yielding a cyanide ion. Thus, when I add inhibited catalase to latex containing hydrogen peroxide, no oxygen is generated for about ten seconds, and thereafter the catalase begins to decompose the hydrogen peroxide and to liberate oxygen at a controlled rate, depending upon the concentrations of the reactants, the pH of the system, etc. This lag when using inactivated catalase is due to the fact that the hydrogen peroxide gradually oxidizes the cyanide compound and destroys its inhibiting effect. Suitable cyanide compounds include hydrogen cyanide and the water soluble alkali metal and alkaline earth metal cyanides. Especially preferred compounds are sodium cyanide and potassium cyanide. The amount of inhibitor required will depend in part upon the particular inactivating compound used and upon the rate at which it is desired that the hydrogen peroxide shall be decomposed. The examples will illustrate preparations that have been tested and found to be satisfactory.

The effect of inhibiting Penicillium catalase with sodium cyanide is shown graphically by the curves plotted in Figure I. The data upon which the curves are based were obtained by adding 30% hydrogen peroxide to a rubber latex mix with a pH of 9.5 in an amount sufficient to make the concentration of peroxide in the mix equal to 3%. The temperature was then adjusted to 10° C. At zero time catalase was added to the latex with mechanical stirring. The time was noted when the volume of the latex mixture began to increase and also when the volume had increased to 30, 60, and 100% of total possible increase based on the amount of hydrogen peroxide present in the mix. The stirring was discontinued when the 30% mark was reached. Curve I is the control. It shows the expansion-time relationship obtained when one part of standardized Penicillium catalase was added to 1000 parts of latex. Curves II and III were obtained by adding to the latex mix standardized Penicillium catalase which contained 5.0 grams of NaCN per liter of enzyme preparation. Curve II was obtained by adding 2 parts of inhibited catalase to 1000 parts of latex; curve III was obtained by adding 1 part of inhibited enzyme to 1000 parts of latex. The composition of the standardized Penicillium catalase preparation is given in Example I. It will be noted that in the control test with uninhibited catalase (curve I), the hydrogen peroxide started to decompose the instant that the catalase and hydrogen peroxide came into contact and that decomposition was complete in 1.5 minutes. On the other hand, when inhibited catalase was used (curves II and III), there was a period of about ten seconds after contacting before decomposition started, after which it progressed at a much slower rate than in the case of the uninhibited catalase. Curves II and III further show that the rate of decomposition can be controlled by adjusting the amount of inhibited catalase added to the peroxide. Similarly, the rate of decomposition can be regulated by varying the proportion of cyanide compound to catalase.

The aqueous dispersion of rubber and the like used in the preparation of cellular masses in accordance with my process may contain any of the usual substances which render the foam capable of gelling upon the application of heat or by the lapse of time at normal temperatures. Calcium sulfate is a coagulant at elevated temperatures and sodium silicofluoride is a particularly suitable agent for inducing gelling at room temperatures, although it too may be used at elevated temperatures.

The use of my inhibited catalase preparations is of especial benefit when the foam is produced under reduced pressure or when it is formed under superatmospheric pressure after which such pressure is released. The delayed action of the inactivated catalase upon the hydrogen peroxide allows the operator time to adjust the pressure conditions before any substantial amount of gas is generated; whereas, when uninhibited catalase is employed, ebullition of oxygen is too rapid and violent to permit pouring of the latex into the molds and adjustment of the pressure conditions.

The following examples are given to illustrate my invention, but they are not introduced with the intention of unduly limiting the generally broad scope of said invention:

Example I

An inhibited catalase preparation was made in the following manner: First, a standardized aqueous catalase preparation was prepared from spent penicillin mold and the activity adjusted (standardized) so that 1 milligram (1 milliliter of a one to 1000 solution) added to an excess (25 milliliters) of 0.3% hydrogen peroxide at pH 7 and 25° C. caused the decomposition of 30 milligrams of hydrogen peroxide. To 1000 grams of the standardized catalase was added 5 grams of sodium cyanide and sufficient acetic acid to make the pH equal to 6.

A portion of the inhibited catalase was tested and was found to have the same capacity to decompose hydrogen peroxide as the standardized uninhibited preparation from which it was made. Another portion of the inhibited catalase was added to a commercial rubber latex, in which about 3% hydrogen peroxide had already been incorporated. No oxygen was evolved for ten seconds. Thereafter, decomposition set in and the rate thereof slowly increased over the next three minutes, at which time only 30% of the hydrogen peroxide had decomposed.

By using a smaller proportion of sodium cyanide in the inhibited catalase preparation, a lag of shorter duration is obtained. Thus, when 500 milligrams of sodium cyanide instead of 5 grams was used in the above formula, the resulting preparation caused 30% decomposition in one minute. Similarly, greater proportions of the cyanide give longer lag periods.

The quantity of inhibited catalase necessary for the complete decomposition of the hydrogen peroxide present in any given latex mixture depends primarily upon the amount of hydrogen peroxide present, the pH of the medium, and the temperature of the latex.

Example II

A latex mixing of the following composition is prepared:

| | Parts by weight |
|---|---|
| Rubber | 63 |
| Sulphur | 2 |
| Zinc diethyldithiocarbonate | 0.3 |
| Mineral oil | 9 |
| Zinc oxide | 1 |
| Caustic potash | 0.4 |
| Casein | 0.1 |
| Oleic acid | 0.2 | in the form of a latex cream sufficiently viscous and concentrated to prevent the segregation of the compounding ingredients. Temperature made 10° C. and 1.0 part by weight of sodium silicofluoride on the dry mix are added. Next one part by volume of 30% hydrogen peroxide to 7 parts of the above latex are added to make a 3.75% solution of hydrogen peroxide. Inhibited catalase preparation is then added in sufficient quantity to cause complete decomposition of the hydrogen peroxide with the production of a light foam. The delayed action of the inhibited catalase preparation allows sufficient time for a very thorough mixing to take place. If the enzyme preparation described above is used, 1.25 parts of inhibited catalase preparation to 1000 parts latex can be used.

The mixture, which assumes the condition of a fine foam in the controlled manner in the course of about 10 minutes, is then placed in moulds, before or after complete volume expansion has been attained, and heated for two or three hours at 90° C. The resulting product when dry is a cellular rubber of low density. Other known methods of shaping and curing the foam may be used.

Example III

A latex of the following composition is prepared:

| | Parts by weight |
|---|---|
| Latex (referred to dry rubber) | 100 |
| ZnO | 5 |
| Sulphur | 2.5 |
| Accelerator (pentamethylene piperidine dithiocarbamate) | 0.5 |
| Mineral oil | 10 |
| Ammonium carbonate | 5 |
| Saponin | 1 |
| Sodium silicofluoride | 1.5 |
| Antioxidant | 1 | in the form of a cream sufficiently viscous and concentrated to prevent separation of the igredients. With the temperature at 10° C., 30% hydrogen peroxide was added to the latex mix until the latex mix was 1.5% by weight hydrogen peroxide. Inhibited catalase preparation is then added ½ part to 1000 parts of latex mixture. The delayed action of the enzyme allows for complete mixing.

The resulting foam may then be processed and fabricated as usual.

Example IV

Prepare a latex according to the directions in Example II. Prepare also an inhibited catalase made from cattle blood catalase as follows:

| | |
|---|---|
| Blood catalase (Armour) grams | 100 |
| Sodium cyanide milligrams | 125 |
| Acetice acid to make pH 7. | |

Add 2 parts of inhibited blood catalase to 1000 parts latex at 10° C. This inhibited catalase preparation has the required properties for the production of foam rubber according to the method described in this application. The strength of this preparation is, however, ¼ that of the penicillin preparation described above.

After adding the inhibited blood catalase there is a 15 second period during which no increase in volume is observed. The subsequent behavior is the same as has been described above.

The resulting foam may be moulded, spread, etc., cured and dried by any suitable method.

I claim as my invention:

1. A process for the production of cellular rubber articles which comprises commingling with an aqueous rubber dispersion a compound selected from the group consisting of hydrogen peroxide and peroxygen compounds capable of liberating hydrogen peroxide under the conditions of operation employed, commingling with the resultant mixture an aqueous solution containing Penicillium catalase and an alkali metal cyanide in such quantity that the volume of the reaction mixture increases less than about ten per cent in the first one minute, converting the dispersion into foam through evolution of oxygen, and solidifying the foam.

2. In a process for the production of cellular rubber articles the step which comprises commingling an aqueous rubber dispersion containing a compound selected from the group consisting of hydrogen peroxide and peroxygen compounds capable of liberating hydrogren peroxide under the conditions of operation employed with an aqueous solution containing Penicillium catalase and sodium cyanide, whereby the volume of the resultant mixture increases less than about ten per cent in about the first one minute.

3. In a process for the production of cellular rubber articles the step which comprises commingling an aqueous rubber dispersion containing a compound selected from the group consisting of hydrogen peroxide and peroxygen compounds capable of liberating hydrogen peroxide under the conditions of operation employed with an aqueous solution containing Penicillium catalase and potassium cyanide, whereby the volume of the resultant mixture increases less than about ten per cent in about the first one minute.

DWIGHT L. BAKER.

REFERENCES CITED

The following references are of record in the file of this patent:

UNITED STATES PATENTS

| Number | Name | Date |
|---|---|---|
| 2,091,184 | Pohl et al. | Aug. 24, 1937 |
| 2,138,081 | Wolf | Nov. 29, 1938 |
| 2,305,714 | Kell | Dec. 22, 1942 |
| 2,432,353 | Talalay | Dec. 9, 1947 |

FOREIGN PATENTS

| Number | Country | Date |
|---|---|---|
| 324,651 | Great Britain | Jan. 20, 1930 |
| 402,067 | Great Britain | Apr. 25, 1933 |

OTHER REFERENCES

"Chemistry and Engineering News" of June 16, 1947, page 1747.

Certificate of Correction

Patent No. 2,540,040 January 30, 1951

DWIGHT L. BAKER

It is hereby certified that error appears in the printed specification of the above numbered patent requiring correction as follows:

Column 3, line 17, for the word "contact" read *contacted*; line 23, for "Na4P₂O₇" read *$Na_4P_2O_7$*; lines 40 and 41, for "erytherocytes" read *erythrocytes*; column 4, line 8, for "midly" read *mildly*; column 6, line 75, for "controllel" read *controlled*; column 7, lines 24 and 25, for "igredients" read *ingredients*; line 41, for "Acetice" read *Acetic*;

and that the said Letters Patent should be read as corrected above, so that the same may conform to the record of the case in the Patent Office.

Signed and sealed this 17th day of April, A. D. 1951.

[SEAL]

THOMAS F. MURPHY,
*Assistant Commissioner of Patents.*